INVENTORS
Wolfgang Hilberg
Bernhard Gnoth &
Ulrich Eckert

BY George H Spencer
ATTORNEY 2,997,600

PULSE GENERATOR WITH MEANS FOR PRODUCING PULSES INDEPENDENT OF LOAD CONDITIONS

Wolfgang Hilberg, Ulm-Soflingen, and Bernhard Gnoth and Ulrich Eckert, Ulm-Donau, Germany, assignors to Telefunken G.m.b.H., Berlin, Germany
Filed Feb. 29, 1960, Ser. No. 11,509
4 Claims. (Cl. 307—88.5)

The present invention relates to an electric circuit arrangement for the generation of pulses which are independent of the load to which they are applied.

In the computer field, particularly for digital electronic computers with ferrite-core storage matrices, pulse generators are commonly used for the generation of large current pulses. It is essential that these current pulses have a constant amplitude even in case of load variations. To achieve this result, it has been known to employ electronic switching circuits controlled by clock pulses and feeding a current amplifier. The structural means which must be used to accomplish this are relatively bulky and require comparatively large amounts of energy.

Therefore, it is an object of the present invention to overcome the above disadvantages by providing a new and improved pulse generator capable of producing current pulses which are substantially independent of the load conditions, but which require very little power.

It is another object of the present invention to provide a new and improved transistorized pulse generator.

It is a further object of the present invention to provide a new and improved control circuit for magnetic storage cores.

According to one aspect of the invention, in a preferred embodiment thereof, it is suggested to provide a transistorized monostable oscillator triggered by pulses of short duration. Two other transistors are provided, one of them being connected in series with the load, and both transistors being connected in series with a common inductance. The oscillator normally maintains the transistor controlling the load current nonconductive, while the other transistor is conductive. Upon a triggered oscillation, the current flowing through the inductance switches from the initially conductive transistor to the non-conductive transistor. The invention, the objects of the invention and further objects and advantages thereof will be understood best from the following detailed description when taken in conjunction with the accompanying drawings, in which:

Figure 1:
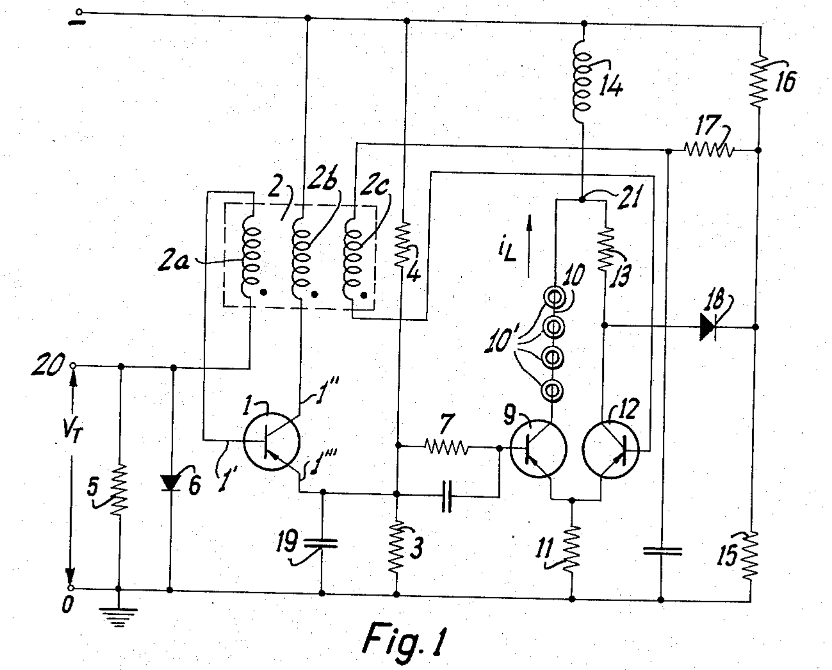
FIGURE 1 is a circuit diagram of a pulse generator according to the present invention.

A transistor 1 serves as the primary control element of a monostable oscillator. The base 1′ of the transistor 1 is coupled to its collector 1″ by means of the input winding 2*b* of a feedback transformer 2. The emitter 1‴ is connected to the junction of a voltage divider 3, 4 which is connected between mass or ground and a negative voltage source. This voltage divider serves as emitter bias as well as emitter output circuit. A capacitor 19 is connected in parallel with resistor 3 so that the emitter 1‴ is connected to ground permitting high frequency A.C. components in the emitter circuit to bypass resistor 3.

A resistor 5 is connected across a trigger pulse input terminal 20 and ground, which input terminal is also connected to one output winding 2*a* of the feedback transformer 2. Thus, terminal 20 is connected to the base of transistor 1 via the feedback transformer.

A diode 6 is connected in parallel with the resistor 5. Resistor 5 and diode 6 bias the base of the transistor 1 to render this transistor normally non-conductive. Upon the application of a negative trigger pulse to terminal 20, transistor 1 is rendered conductive and, due to the feedback action of transformer 2, stays conductive for some time after the decay of the trigger pulse. Thus, transistor 1 is the control element of a blocking oscillator.

Emitter 1‴ of transistor 1 is further connected to the base of a second transistor 9 via a resistor 7 shunted by a capacitor for the suppression of A.C. components. The voltage divider 3, 4 normally renders transistor 9 non-conductive as long as transistor 1 is non-conductive.

The load 10 of the entire circuit device is connected to the collector of transistor 9 and comprises, for example, the line wire or the column wire 10 running through a plurality of non-adjustable cores 10′ of a switch core storage matrix as used in modern computors.

The emitter of transistor 9 is connected to ground via a resistor 11.

A third transistor 12 and its collector load resistor 13 are connected in parallel with transistor 9 and its load 10. Resistor 11 serves as common emitter resistor for the transistors 9 and 12; thus, the emitters of these two resistors are directly interconnected and biased to the same potential. Load 10 and resistor 13 have a common junction 21 and an inductance 14 is connected between the negative voltage source and this common junction 21. Thus, inductance 14 is inserted in the collector circuits of both the transistors 9 and 12. The base of the transistor 12 is connected in series with a third winding of the feedback transformer 2. This lastmentioned winding is further connected via a resistor 17 to the junction of a voltage divider 15, 16 which is also connected between ground and the negative voltage source. Due to this circuit connection and the appropriate dimensioning of the voltage divider, the transistor 12 is rendered conductive when transistor 1 is non-conductive and voltage is induced in winding 2*c* of transformer 2. A current flows through the inductance 14, resistor 13, the collector-emitter path of transistor 12 and resistor 11.

The circuit described thus far operates as follows:

In the normal state, transistors 1 and 9 are biased to non-conductive condition, while transistor 12 is conductive. Upon the application of a trigger pulse to terminal 20, the transistor 1 is rendered conductive and a current flows through the emitter 1‴ while current also flows through resistor 3, so that the voltage drop across resistor 3 is increased. This increase of the voltage drop across resistor 3 produces a forward bias of the base emitter path of transistor 9 which becomes conductive. The base bias of transistor 12 is simultaneously reduced through the winding 2*c* of the feedback transformer 2, substantially blocking the current through transistor 12. Thus, when the transistor 1 becomes conductive, the load current through inductance 14 no longer flows through transistor 12 but, instead, flows through transistor 9 and its associated load 10. Due to the slow response of inductance 14, a fast variation of the current during and after the change of its path from transistor 12 to transistor 9 is not possible. Thus, for a particular period of time, the load current now guided through load 10 is almost independent of the magnitude of this load 10 which may be variable. The current is primarily determined by the inductance 14, the fixed resistors 11 and 13 and the characteristics of transistor 12 through which the load current is guided normally. This would also be true if the load 10 were not directly connected to the transistor 9 but by means of another transformer. The latter mode can be of advantage if one desires to render the load independent of fixed voltages of the control circuit.

Figures 2, 3:
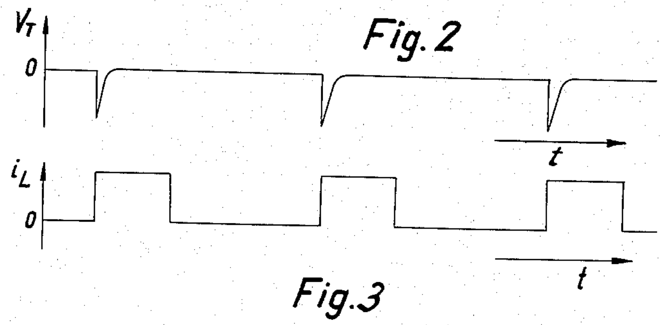
FIGURE 2 is a plot of the trigger pulses against time, as used in the circuit shown in FIGURE 1.
FIGURE 3 is a plot of the load current pulses, as they are produced in the circuit shown in FIGURE 1.

FIGURE 2 illustrates the trigger pulses $V_T$ as applied to terminal 20, and FIGURE 3 illustrates the current $i_L$ through load 10 as effected by this circuit. As stated above, this current is substantially independent of the load resistor and is determined only by the inductance 14, the ohmic resistors 13 and 11 and the rest resistance of the emitter-collector path of transistor 12 when open.

The feedback transformer 2 is designed to keep transistor 1 conductive for a specific period of time determined by the inductance of the transformer 2. For this period of time, the predetermined current through inductance 14 flows through the load 10, as shown in FIGURE 3. After this period of time has elapsed, the transistor 1 is blocked again, thereby blocking transistor 9 and reopening transistor 12, whereby the load current switches over again from load 10 and transistor 9 to transistor 12.

For further improvement of the circuit, a diode 18 can be connected between the junction of the resistors 15 and 16 and the collector of transistor 12. Diode 18 and resistor 17 serve as a protective circuit against excessive control of transistor 12.

Elements 17 and 18, as well as capacitor 19 and the capacitor shunting resistance 7, are not essential for the invention but serve as improvement of the basic invention.

The circuit as shown in FIGURE 1 could be modified as follows: elements 4, 5 and 6 could be omitted and the transistor 1 then could be biased in connecting the input terminal to a small positive bias with respect to ground, sufficient to bias transistor 1 normally to the non-conductive state.

It will be understood that the above description of the present invention is susceptible to various modifications, changes and adaptations, and the same are intended to be comprehended within the meaning and range of equivalents of the appended claims.

We claim:

1. A pulse generator for the production of current pulses which are substantially independent of the load comprising: a first transistor having input and output circuits; a feedback transformer connected to said input and output circuit of said first transistor; means including said input circuit for normally biasing said transistor non-conductive; a second transistor having a load circuit and a control circuit; means connecting an output of said first transistor to the control circuit of said second transistor for rendering said second transistor non-conductive only as long as said first transistor is non-conductive; a third transistor; means including said transformer for rendering said third transistor normally conductive as long as said first transistor is non-conductive; and an inductance connected in series with both said load circuit of said second transistor and said third transistor, the current through said inductance flowing alternately through said second and said third transistor.

2. A pulse generator comprising: a monostable blocking oscillator having input and output circuits; a first transistor; a load circuit connected in series with said first transistor; a second transistor connected in parallel with said first transistor and said load circuit; an inductance connected in series with said first and second transistors; first connection means interconnecting said first transistor and said blocking oscillator for rendering said first transistor conductive in one state of said blocking oscillator and non-conductive in the opposite state; and second connection means interconnecting said second transistor and said blocking oscillator for producing conduction conditions reversed as in said first transistor.

3. A pulse generator comprising: a first transistor having a base, an emitter and a collector; a control circuit; a feedback transformer having first, second and third windings, said first winding interconnecting said control circuit and said base, said second winding being connected to said collector; a second trasistor having a base, an emitter and a collector, conductive means for interconnecting the emitter of said first transistor and the base of said second transistor; a load circuit connected in series with the collector of said second transistor; a third transistor having a base, an emitter and collector, the base of said third transistor being connected in series with said third transformer winding, the emitter and collector of said third transistor being connected to the emitter of said second transistor and said load circuit; an inductance connected in series with said load circuit and the emitter-collector path of said third transistor; and means for normally biasing said first and second transistors non-conductive and said third transistor conductive.

4. In a control circuit for a switch core matrix, a pulse generator comprising: a monostable blocking oscillator having input and output circuits; a first transistor; a control wire for magnetizable cores connected in series with said first transistor; a second transistor connected in parallel with said first transistor and said control wire; an inductance connected in series with said first and second transistors; first connection means interconnecting said first transistor and said blocking oscillator for rendering said first transistor conductive in one state of said blocking oscillator and non-conductive in the opposite state; and second connection means interconnecting said second transistor and said blocking oscillator for producing conduction conditions reversed as in said first transistor.

References Cited in the file of this patent

UNITED STATES PATENTS 2,589,085 Houghton ______________ Mar. 11, 1952

FOREIGN PATENTS 552,301 Great Britain __________ Mar. 31, 1943

UNITED STATES PATENT OFFICE

CERTIFICATE OF CORRECTION

Patent No. 2,997,600 August 22, 1961

Wolfgang Hilberg et al.

It is hereby certified that error appears in the above numbered patent requiring correction and that the said Letters Patent should read as corrected below.

In the heading to the printed specification, between lines 8 and 9, insert the following:

Claims priority, application Germany Mar. 4, 1959

Signed and sealed this 19th day of December 1961.

(SEAL)
Attest:

ERNEST W. SWIDER
Attesting Officer

DAVID L. LADD
Commissioner of Patents

USCOMM-DC